Figures 1, 2:
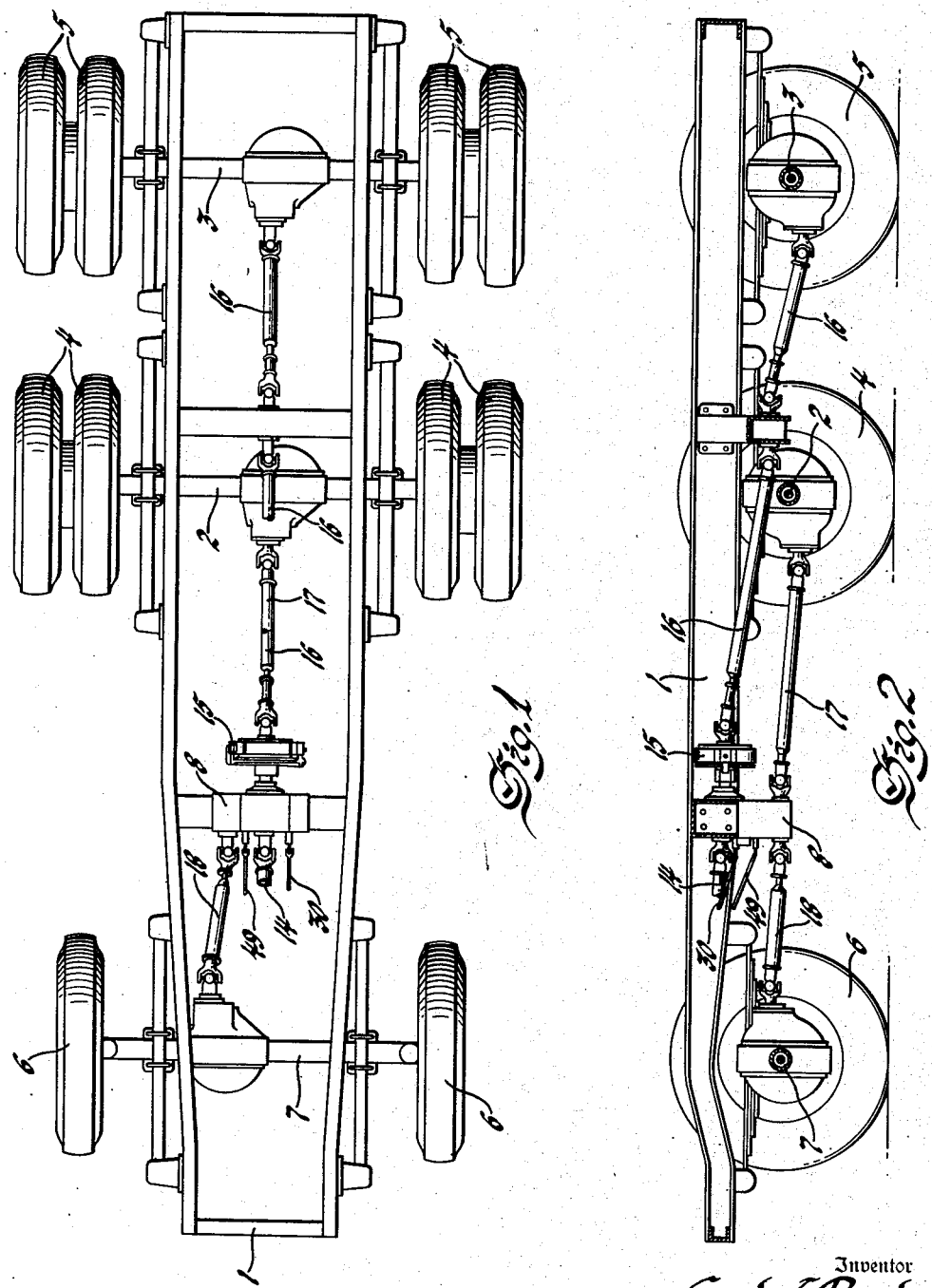

June 21, 1955 C. J. BOCK 2,711,222
MOTOR VEHICLE
Filed June 8, 1949 3 Sheets-Sheet 1

Inventor
Carl J. Bock
By
Spencer, Willits, Helwig & Bellio
Attorneys

June 21, 1955  C. J. BOCK  2,711,222
MOTOR VEHICLE

Filed June 8, 1949  3 Sheets-Sheet 3

Inventor
Carl J. Bock

Spencer, Willits, Helmig & Gaillio
Attorneys

United States Patent Office 2,711,222
Patented June 21, 1955

2,711,222

MOTOR VEHICLE

Carl J. Bock, Birmingham, Mich., assignor to General Motors Corporation, Detroit, Mich., a corporation of Delaware Application June 8, 1949, Serial No. 97,881

2 Claims. (Cl. 180—23)

This invention relates to the transmission of drive for motor vehicles of the type in which the steerable wheels as well as the non-steerable wheels are traction or drive wheels and the structure to be described constitutes an improvement on what is disclosed in my Patents No. 2,290,089, granted July 14, 1942, and No. 2,354,300 granted July 25, 1944.

For best service it has been considered that the front wheels should serve primarily for steering the vehicle with the driving traction delivered through the rear wheels. This is especially the preference during normal operation on hard road surface. Front wheel drive at high speeds has proved to be dangerous because of increased handling difficulties. On the other hand, all wheel drive at slow speed in soft ground is of importance if the vehicle is to be useful under adverse conditions.

Many vehicles have been produced in which engine power is divided between front and rear axles with provision for connecting and disconnecting the steerable wheels manually at the vehicle driver's selection. Manual selection being a matter of individual judgment and experience there is no assurance that the controls will be manipulated with care and skill and without abuse.

Elimination of demand on operator attention and also avoidance of hazards accompanying front wheel drive at higher speeds on sharp highway curves have been suggested by way of automatic disconnection of power transmission to the front wheels through the introduction of a one-way clutch in the drive train on the basis that the curved path of travel of the steerable front wheels exceeds that of the trailing non-steerable wheels. At times when the vehicle is following road curvature or is being steered in an arcuate path the front wheels rotate faster than the rear wheels and drive is through the rear wheels only, but during straight line vehicle travel traction is supplied by the front wheels without regard to preferences for lack of front wheel drive at higher speed travel on hard and dry level pavement or the need for front wheel drive for more severe operating conditions. Lack of front wheel drive is thus dependent entirely on non-straight line travel.

In order more fully to confine front wheel drive to critical needs of slower vehicle travel on soft ground, mud or ice when the drive to the rear wheels alone would tend to slip or spin the wheels, and to eliminate front wheel drive for normal hard pavement travel, it is now proposed to transmit front wheel drive at a slightly reduced speed implemented by provision for accommodating front wheel overrun. Accordingly, the transmission of power to the steerable wheels can occur only when the peripheral speed of the rear wheels exceeds or overruns that of the front wheels so that the steerable wheels are designedly freed from drive for easier and more secure maneuverability of the vehicle, but are immediately available and active for pulling purposes to assist the rear wheels when more traction is required and safe and proper vehicle operation under varying conditions is assured without the necessity for exercise of prudent judgment and caution and the employment of only a skilled and carefully trained operator.

Figure 3:
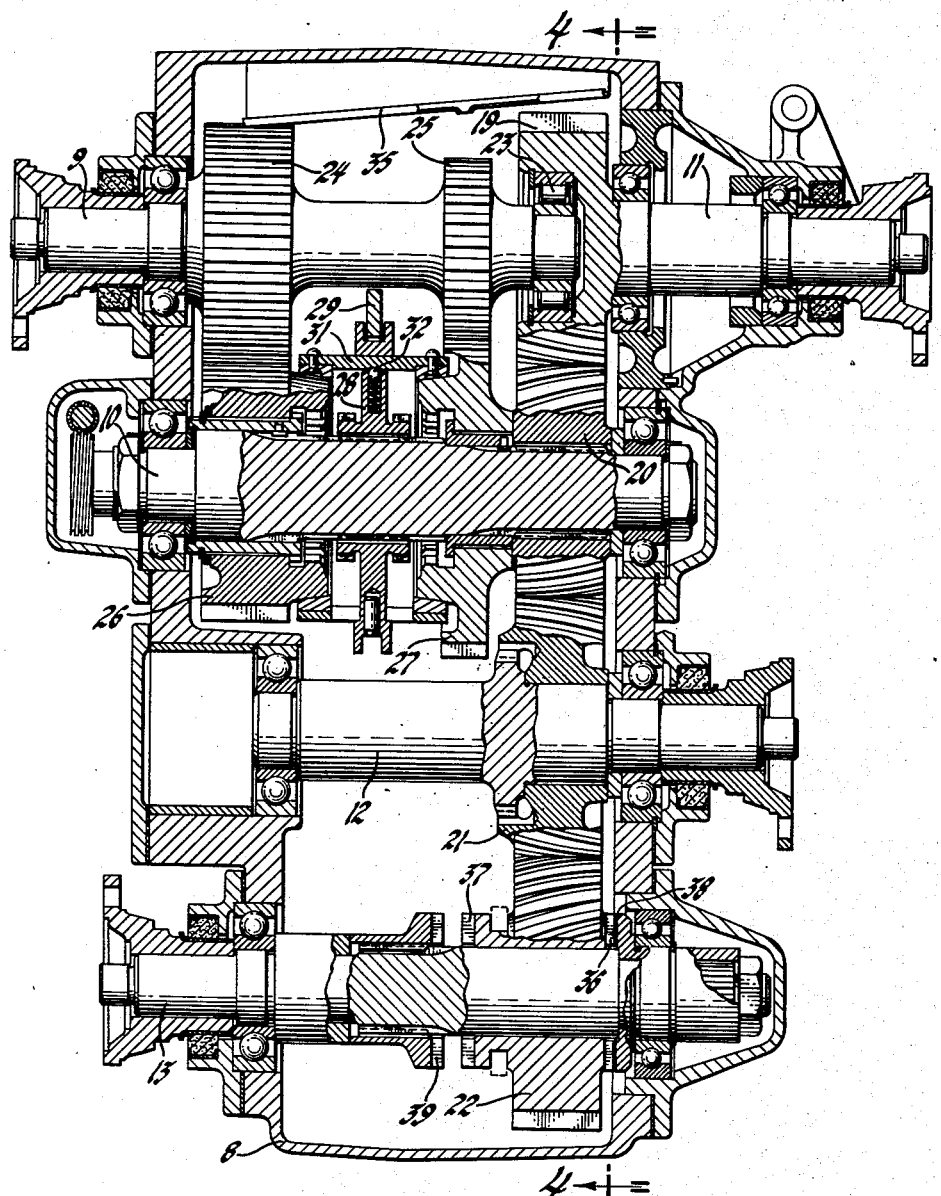
Figure 4:
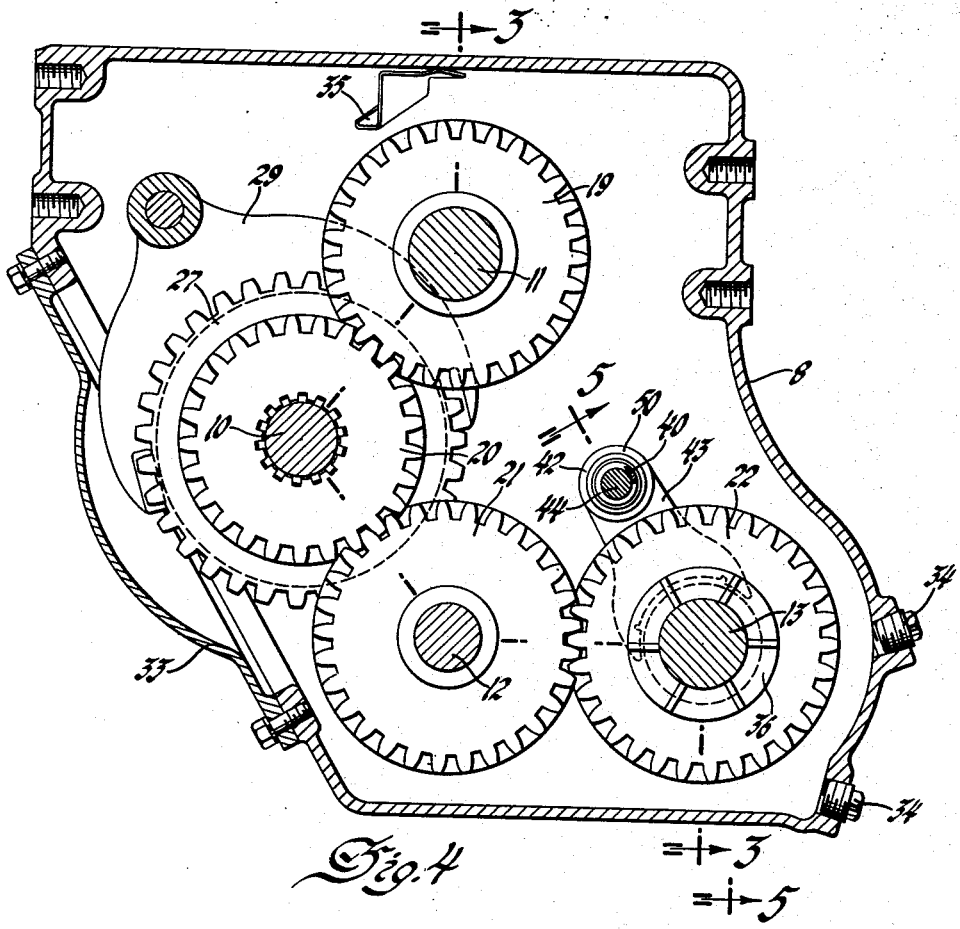
Figure 5:
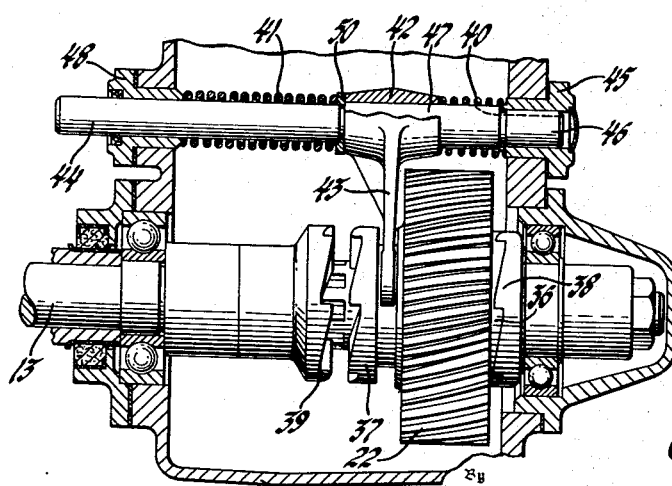

The automatic control of front wheel drive and relief of driver's attention will be better described in connection with the accompanying drawings wherein Figures 1 and 2 are, respectively, a plan view and a longitudinal section of the vehicle running gear to which the invention is applicable; Figure 3 is a longitudinal section of the power divider unit as taken on line 3—3 of Figure 4; Figure 4 is a transverse section of the same power divider as on line 4—4 of Figure 3 and Figure 5 is a detail section as on line 5—5 of Figure 4.

In the drawing the usual chassis frame 1 for mounting the load carrying body is conventionally illustrated as being spring supported on front and rear wheel axles, each having road wheels at opposite ends. Tandem drive axles 2 and 3 each have dual wheels 4—4 and 5—5, respectively, at opposite ends, while single wheels 6—6 are dirigibly mounted for steering purposes on opposite ends of the front drive axle 7. These several wheels are all of the same diameter and preferably are identical and interchangeable with one another. Similarly, the gearing in the several axles is of the same ratio and preferably of identical structure and includes differential mechanism. Each axle is joined by propeller shafting to a power divider unit, including a housing or case 8 supported intermediate the ends of the chassis frame 1 and receiving power from a driving source, such as a conventional engine and change speed gearbox. For practical reasons the transfer case is built as a separate unit, but, if desired, it could be readily combined with the main power unit.

Opposite end walls of the case 8 are formed with aligned openings in which bearings are suitably mounted for receiving an input shaft 9, a countershaft 10, a first output shaft 11, a second output shaft 12 and a third output shaft 13. The input shaft 9 is arranged to be coupled directly with the power delivery shaft from the engine, only a part of which is shown at 14 and is to be driven in both forward and reverse drive as determined by the drive setting of the main gearbox. A service or parking brake 15 is associated with the output shaft 11 which is coupled by suitable propeller shafting 16 with the rear drive axle 3. The other rear axle 2 is coupled by propeller shafting at 17 with the output shaft 12, and similarly propeller shafting 18 couples the output shaft 13 with the front axle 7. Associated with the several shafts inside the housing 8 is a train of constant mesh helical gears 19, 20, 21 and 22. The gear 19 is integral with the inner end of the shaft 11, and, as best shown in Figure 3, it supports a bearing 23 in which is piloted the inner end of the input shaft 9. The gear 20 is separately formed but is keyed on the countershaft 10 for rotation therewith. Gear 21 is also separately formed and has a driving spline connection with the output shaft 12. Gear 22 in turn is separately formed but is mounted rotatably and for relative axial shifting movement on the output shaft 13. These several gears are driven conjointly from the input shaft 9 through a two speed selectively controlled gear arrangement of a well known type. The arrangement comprises a pair of drive gears 24 and 25 of different ratio formed on the input shaft 9 and in constant mesh, respectively, with driven gears 26 and 27 rotatably mounted on the countershaft 10 and provided on adjacent sides with jaw teeth for engagement by complementary clutch teeth on a shift collar 28 slidably splined on the countershaft 10. A shifter fork 29 is mounted on a control rod extending through the wall of the case for connection by linkage 30 with a driver control lever whereby the clutch collar 28 may be shifted in either direction from the neutral position, shown in Figure 3, for coupling the countershaft to one or the other of the gears 26 and 27. Smoothness of clutch engagement is afforded by means of a friction clutch sleeve 31 which is carried by the shiftable clutch 28 by means of a releasable spring detent 32 into driving engagement with corresponding clutch surfaces on the respective gears for bringing relative rotation of the elements into substantial synchronism.

It is sometimes desirable to incorporate a power take off device and with that in mind the transfer case 8 is provided with an opening in one side which in Figure 4 is shown as being closed by a detachable cover plate 33. Removal of this cover plate will enable the substitution of a power take off unit consisting of a housing supporting a shaft and gear to be placed in driving mesh with the gear 26 or 27. The power take off gear preferably is arranged to be selectively clutched with the power take off shaft so that by proper operation of the vehicle controls, including the selector clutch 28, the power take off mechanism may be operated from the engine whether or not the road wheels are being driven and in any drive setting of the main gearbox.

Near the bottom and on the right-hand side of the transfer case, as seen in Figure 4, are a pair of removable plugs 34 for lubricant drain and filling purposes. The lowermost gears of the train normally operate within the lubricant supply and splash the lubricant on the other parts and the bearings. A pair of the lubricant is carried by the constant mesh gears into the top of the case where there is located an oil receiving trough 35. To lead the lubricant to and drop it directly over the gears 24 and 25 thereby making certain that all the parts in the upper part of the case are adequately lubricated.

As best seen in Figures 3, 4 and 5, the helical toothed gear 22 shiftably mounted on the output shaft 13 is formed on opposite faces with ratchet teeth 36 and 37 and these ratchet teeth are for clutching drive engagement, respectively, with mating ratchet teeth 38 and 39, conveniently formed on collars which are fixed on the shaft 13 in axially spaced apart relation on opposite sides of the shiftable gear 22. One set of the ratchets provide a one-way drive to the front axle when the main gearbox is set to drive the vehicle forward, and the other set of ratchets afford a one-way clutch drive for reverse or backward vehicle travel, as determined by the main gearbox setting. The helical tooth formations provide a side thrust on the gear as an aid in urging the ratchets into engagement. As a further clutch engaging force there are provided a pair of opposed springs 40 and 41 arranged to act on the gear 22 through engagement with opposite ends of the head 42 of a shifter fork 43 projected into an annular groove on the hub of the gear 22. The effectiveness of the respective springs 40 and 41 is controlled by the position of a shift rod 44 having sliding bearing support on the opposite end walls of the gear housing 8. It will be noted in Figure 5 that the bearing at one end of the shifter rod is afforded by a sleeve 45 within which is slidable a reduced end portion 46 of the shifter rod, and that the inner end of the bearing sleeve 45 affords a stop abutment for the shoulder formed between the reduced end 46 and an intermediate enlarged portion 47 of the shift rod. A similar shoulder is afforded between the opposite end of the enlarged intermediate portion 47 and the other reduced diameter end portion of the rod, which has a bearing in the sleeve 48 and projects therebeyond for connection by means of a link 49 (see Figures 1 and 2) with a manually operated lever in the driver's cab. While a separate control lever may be used, by preference the shifter rod 44 is linked to the manual shift lever which controls the main gearbox and is arranged to be pulled forward whenever the main gearbox is in reverse gear setting. In all other speed settings the shifter rod 44 will be in the position shown in Figure 5 with its stop shoulder in abutment with the collar 45. It will be noted that the shift fork head 42 is slidably mounted on the enlarged rod portion 47 and its forward end contacts with a washer or ring 50 sleeved on the forward reduced portion of the rod and affording a seat for the free end of the coil spring 41. Thus when the rod is shifted forward the washer 50, by reason of its engagement with the adjacent shouldered end of the enlarged rod portion 47, moves with the rod and restricts the spring 41, taking it out of effective action and thereby allowing the spring 40 to come into action against the shifter 42 for resiliently urging the gear 22 along the shaft 13 for disconnecting the ratchet teeth 36—38 and engaging the ratchet teeth 37—39. The spring 40 has sufficient force to maintain the ratchet teeth 37—39 in driving engagement except in those cases where the front wheels tend to overrun the rear wheels, in which case the spring yields, allowing the teeth 37 to be cammed out of engagement with the teeth 39 to accommodate the overrun. The spring 40, however, is lighter than the spring 41 and the force of the spring 40 is such as to be overcome by the force exerted by the spring 41 when the shifter rod is retracted to allow full action of the spring 41. Thus when the spring 41 is free to act it yieldably maintains the clutch teeth 36—38 in drive engagement, but yields to the overrunning force of the front axle which cams the ratchet teeth out of engagement.

The overrunning clutch drive alone is insufficient in itself to free the steerable wheels from driving traction at times when front wheel drive is not wanted as, for example, when the vehicle is traveling in a straight ahead direction on hard road surface. To supplement the action of the one-way clutch in eliminating front wheel drive except under adverse operating conditions a simple gear ratio reduction is provided by forming the gear 22 with at least one more tooth than is formed in its meshing gear 21. A satisfactory speed reduction is obtained, for example, by making the gear 22 with thirty teeth and the gear 21 with twenty-nine teeth. In order that both output shafts 11 and 12 from driving the tandem rear axles will rotate at the same speed the gear 19 has the same number of teeth as the gear 21. By reason of this stepdown gearing the forward drive axle output gear 22 is always driven at a slower speed than are either of the rear axle output shafts 11 and 12 so that drive to the front axle can only be transmitted in the event the rear wheels spin on the ground surface and thereby tend to overrun the front wheels and which condition is usually encountered only on ice or on soft ground at slow speed.

When the vehicle is operated in the forward direction, power is transmitted from the output shafts 11 and 12 to the rear axles 2 and 3 and the wheels on these axles turn and propel the vehicle so that the wheels on the front axle 7 turn and exert force through the driving gears in the axle to rotate the drive shaft 18 and thus rotate the output shaft 13.

At this time the gear 22 turns in the same direction as the shaft 13. During operation of the vehicle on a hard surfaced road where the wheels of the two rear axles have good traction, these wheels propel the vehicle at a rate such that the wheels of the front axle drive the output shaft 13 at substantially the same rate that the output shafts 11 and 12 are driven. The gear 22 is driven by the gear 21 on output shaft 12, and as the gear 22 is slightly larger than the gear 21, the gear 22 is rotated at a slightly slower rate than the gear 21 and the output shaft 12, and therefore, at a slightly slower rate than the output shaft 13 which is being driven through the front axle at substantially the same rate as the output shafts 11 and 12. The direction of rotation of the output shaft 13 and the gear 22 at this time is such that the ratchet teeth 38 overrun the teeth 36 and permit the shaft 13 to turn relative to the gear 22.

Under adverse driving conditions in which the wheels of the rear axles 2 and 3 have poor traction, these wheels propel the vehicle at a less rapid rate and the wheels of the vehicle front axle are not rotated fast enough to cause the shaft 13 to turn faster than the gear 22. Hence, the ratchet teeth 36 on the gear engage the teeth 38 so the gear 22 drives the shaft 13, and therefore drives the wheels of the front axle so that these wheels help to propel the vehicle.

The wheels of the front axle continue to be driven until driving conditions again are such that the wheels of the rear axles propel the vehicle fast enough to cause the output shaft 13 to be rotated more rapidly than the gear 22, whereupon the application of driving force to the wheels of the front axle is automatically discontinued.

The equipment operates in a similar manner when the vehicle is being driven in the reverse direction. At this time the gear 22 is held by the spring 40 in the position in which the ratchet teeth 37 and 39 are operative. Under normal driving conditions the shaft 13 is driven by the vehicle wheels at a more rapid rate than the gear 22, and the teeth 39 overrun the teeth 37. Under adverse driving conditions the shaft 13 is not driven by the vehicle wheels fast enough to overrun the gear 22, and the teeth 37 engage the teeth 39 and cause the gear 22 to drive the shaft 13 and thus apply driving force to the wheels of the vehicle front axle.

I claim:

1. In a self propelled vehicle, an engine, a front driving axle provided with steerable wheels, a rear driving axle provided with non-steerable wheels, the wheels of both of said axles being of substantially the same diameter, said driving axles each having associated therewith a drive shaft through which power is transmitted to the axle and each having driving gears providing a selected gear reduction, an input shaft, means for connecting said input shaft to said engine for driving said input shaft selectively in a first direction or in the opposite direction, a first output shaft driven from said input shaft at a predetermined speed relative to said input shaft, said first output shaft being adapted to have connected thereto the drive shaft associated with the rear driving axle of a vehicle, a second output shaft adapted to have connected thereto the drive shaft associated with the front driving axle of a vehicle, a gear train for driving said second output shaft from said input shaft at a selected speed relative to said input shaft which is slightly lower than said predetermined speed, a first overrunning clutch for connecting said gear train with said second output shaft when said input shaft is driven in said first direction, a second overrunning clutch for connecting said gear train with said second output shaft when said input shaft is driven in said opposite direction, and manually controlled means for at times rendering said first overrunning clutch effective and for at other times rendering said second overrunning clutch effective.

2. In a self propelled vehicle, front and rear axles provided with axle gearing of identical ratio and with wheels of the same diameter, an engine, a power divider unit including an input shaft and a plurality of output shafts, means connecting said input shaft to said engine for driving said input shaft selectively in opposite directions, means operatively connecting one of said output shafts to said front axle and means operatively connecting another of said output shafts to a rear axle and driving said front and rear axles independently of each other, gear means between said input and output shafts driving said output shafts at slightly different speeds, a pair of overrunning clutches interposed in the driving connection through which the slower running output shaft is driven by said gear means, each of said overrunning clutches being arranged in the driving connection from said input shaft to the slower running output shaft so that each of said overrunning clutches is capable of transmitting power to said slower running output shaft in one of opposite directions according to a selected driven direction of the input shaft, and manually controlled means coupling one of said overrunning clutches to said slower running output shaft according to said selected driven direction of said input shaft, whereby power drive is provided to the slower driven axle only responsive to traction slippage of the wheels of the faster driven axle.

References Cited in the file of this patent

UNITED STATES PATENTS

| | | |
|---|---|---|
| 1,905,114 | Lauterbur et al. | Apr. 25, 1933 |
| 1,976,071 | Hoffman | Oct. 9, 1934 |
| 2,107,072 | Herrington | Feb. 1, 1938 |
| 2,185,636 | Kysor | Jan. 2, 1940 |
| 2,290,089 | Bock | July 14, 1942 |
| 2,344,388 | Bixby | Mar. 14, 1944 |
| 2,352,301 | Welles | June 27, 1944 |
| 2,354,300 | Bock | July 25, 1944 |
| 2,394,429 | Crosman | Feb. 5, 1946 |
| 2,395,108 | Donley et al. | Feb. 19, 1946 |
| 2,399,201 | Buckendale et al. | Apr. 30, 1946 |
| 2,415,758 | Peterson et al. | Feb. 11, 1947 |
| 2,443,720 | Burrus | June 22, 1948 |
| 2,450,896 | Kimberly, Jr. | Oct. 12, 1948 |
| 2,494,156 | Bechler | Jan. 10, 1950 |